(12) United States Patent
Lastusaari et al.

(10) Patent No.: US 11,168,247 B2
(45) Date of Patent: Nov. 9, 2021

(54) INDICATING THE INTENSITY OF A PREDETERMINED TYPE OF RADIATION

(71) Applicant: Turun yliopisto, Turku (FI)

(72) Inventors: Mika Lastusaari, Turku (FI); Isabella Norrbo, Turku (FI); Pekka Laukkanen, Turku (FI)

(73) Assignee: TURUN YLIOPISTO, Turku (FI)

( * ) Notice: Subject to any disclaimer, the term of this patent is extended or adjusted under 35 U.S.C. 154(b) by 0 days.

(21) Appl. No.: 16/617,617

(22) PCT Filed: Oct. 17, 2018

(86) PCT No.: PCT/FI2018/050762
§ 371 (c)(1),
(2) Date: Nov. 27, 2019

(87) PCT Pub. No.: WO2019/092309
PCT Pub. Date: May 16, 2019

(65) Prior Publication Data
US 2020/0263082 A1 Aug. 20, 2020

(30) Foreign Application Priority Data
Nov. 7, 2017 (FI) ..................................... 20175993

(51) Int. Cl.
*C09K 9/00* (2006.01)
*C01B 39/02* (2006.01)
(Continued)

(52) U.S. Cl.
CPC .............. *C09K 9/00* (2013.01); *C01B 39/026* (2013.01); *C01B 39/14* (2013.01); *G01J 1/0411* (2013.01);
(Continued)

(58) Field of Classification Search
CPC ....... C09K 9/00; C09K 11/676; C01B 39/026; C01B 39/14; C01B 33/26; C01B 33/32;
(Continued)

(56) References Cited

U.S. PATENT DOCUMENTS 3,591,810 A 7/1971 Jackson
2015/0198479 A1 7/2015 Cho et al.
(Continued)

FOREIGN PATENT DOCUMENTS

DE 19833176 2/2000
EP 1681335 7/2006
WO 8906347 7/1989

OTHER PUBLICATIONS

FI 20175993, "FI Search Report", dated Jun. 6, 2018, 2 pages.
(Continued)

*Primary Examiner* — David P Porta
*Assistant Examiner* — Mamadou Faye
(74) *Attorney, Agent, or Firm* — Kilpatrick Townsend & Stockton LLP

(57) ABSTRACT

A detecting device for indicating the intensity of a predetermined type of radiation present in electromagnetic radiation incident on the detecting device can include:
 a filter element for filtering the incident electromagnetic radiation, wherein the filter element is configured to filter off electromagnetic radiation with a wavelength of above 590 nm from the incident electromagnetic radiation;
 a converging element configured to increase the density of photons of the predetermined type of radiation present in the incident electromagnetic radiation; and
 a sensor element of material arranged to receive the incident electromagnetic radiation that has passed through the filter element and the converging element
(Continued)

for indicating the intensity of the predetermined type of radiation present in the incident electromagnetic radiation by change of the color of the sensor element of material, wherein the material is represented by the following formula: (M')8(M"M''')6O24(X,S)2:M'''' (formula (I)).

19 Claims, 3 Drawing Sheets

(51) Int. Cl.
C01B 39/14 (2006.01)
G01J 1/04 (2006.01)
G01J 1/42 (2006.01)
G01J 1/50 (2006.01)
G02B 5/20 (2006.01)

(52) U.S. Cl.
CPC .............. G01J 1/0488 (2013.01); G01J 1/429 (2013.01); G01J 1/50 (2013.01); G02B 5/208 (2013.01); C01P 2006/60 (2013.01); G01J 2001/4266 (2013.01)

(58) Field of Classification Search
CPC .. G01J 1/0411; G01J 1/429; G01J 1/50; G01J 2001/4266; G02B 5/208; C01P 2006/60; G02C 7/00

See application file for complete search history.

(56) References Cited

U.S. PATENT DOCUMENTS

2016/0100764 A1* 4/2016 Teich ................... A61B 5/6898
348/77
2017/0191866 A1 7/2017 Balooch et al.

OTHER PUBLICATIONS

PCT/FI2018/050762, "International Search Report and Written Opinion", dated Mar. 19, 2019, 19 pages.

Abet Technologies, "Solar Simulator Elements: Components of a Solar Simulator", Sep. 8, 2015, retrieved via internet at https://web.archive.org/web/20160908143303/http://abet-technologies.com:80/solar-simulators/solar-simulator-elements, pp. 1-4.

Abet Technologies, "Sun 3000 Class AAA", Sep. 8, 2016, retrieved via internet at https://web.archive.org/web/20160908135829/http://abet-technologies.com:80/solar-simulators/sun-3000-class-aaa/, pp. 1-4.

Armstrong et al., "Structural observation of photochromism", Chemical Communications, Feb. 10, 2006, pp. 1094-1096.

Newport Corporation, "Sol-UV Ultraviolet Solar Simulators," Oct. 10, 2017, retrieved via Internet at https://web.archive.org/web/20171010233855/https://www.newport.com/f/uv-solar-simulators, pp. 1-14.

Norrbo et al., "Persistent Luminescence of Tenebrescent $Na_8Al_6Si_6O_{24}(Cl,S)_2$: Multifunctional Optical Markers", Inorganic Chemistry, vol. 54, No. 16, Aug. 6, 2015, pp. 7717-7724.

* cited by examiner

INDICATING THE INTENSITY OF A PREDETERMINED TYPE OF RADIATION

CROSS-REFERENCE TO RELATED APPLICATIONS

The present application is a U.S. national phase application under 35 U.S.C. § 371 of PCT/FI2018/050762, filed on Oct. 17, 2018, which claims the benefit of priority to FI Application No. 20175993, filed on Nov. 7, 2017, the entire contents of each of which are incorporated by reference herein for all purposes.

FIELD OF THE INVENTION

The present application relates to a detecting device and a method for indicating the intensity of a predetermined type of radiation present in incident electromagnetic radiation, and to the use of the detecting device.

BACKGROUND

Elevated levels of ultraviolet (UV) irradiation, whether caused by sunlight or tanning ultraviolet devices, has the adverse effect of increasing the probability of skin cancer, other diseases of the skin as well as skin aging. Knowing when to seek for cover from ultraviolet radiation or when to apply or reapply sunscreen lotion is thus of importance.

UV responsive photochromic organic molecules that change color upon UV exposure can be used. Currently, there are such devices as UV indicator bracelets and cards that can be used to indicate the level of solar UV radiation. These are based on organic molecules such as spiro-oxazines, spiropyrans, fulgides, fulgimides, bisimidazoles and viologen derivatives. Usually, the color from these materials fades when UV exposure is removed, thus making them reusable indicators, but some of them are for single use. However, many of the reusable photochromic molecules have a short lifetime, and they can thus lose their functionality after too long or too intense UV exposure. Spiro-oxazines, however, may last for two to three years. The drawback for the spiro-oxazines is their high price. The high prices and short lifetimes decrease the usability of these materials in the photochromic UV indicator devices. Hackmanite has also the ability to change color as a result of being exposed to ultraviolet radiation. However, when used as such the color intensity thereof may be rather weak because sunlight irradiance contains only about 3% of ultraviolet A (UVA) and about 0.1% of ultraviolet B (UVB).

The inventors have thus recognized a need for a low-cost radiation indicating device that is reusable and can be reliably used for a long period of time.

PURPOSE

The purpose is to provide a new type of detecting device and its use. Further, the purpose is to provide a method for determining the intensity of a predetermined type of radiation.

SUMMARY

The detecting device according to the present application is characterized by what is presented in claim 1.

The method according to the present application is characterized by what is presented in claim 16.

The use according to the present application is characterized by what is presented in claim 18.

BRIEF DESCRIPTION OF THE DRAWINGS

The accompanying drawings, which are included to provide a further understanding of the detecting device and the method and constitute a part of this specification, illustrate embodiments and together with the description help to explain the principles of the above. In the drawings.

DETAILED DESCRIPTION

Figure 1:
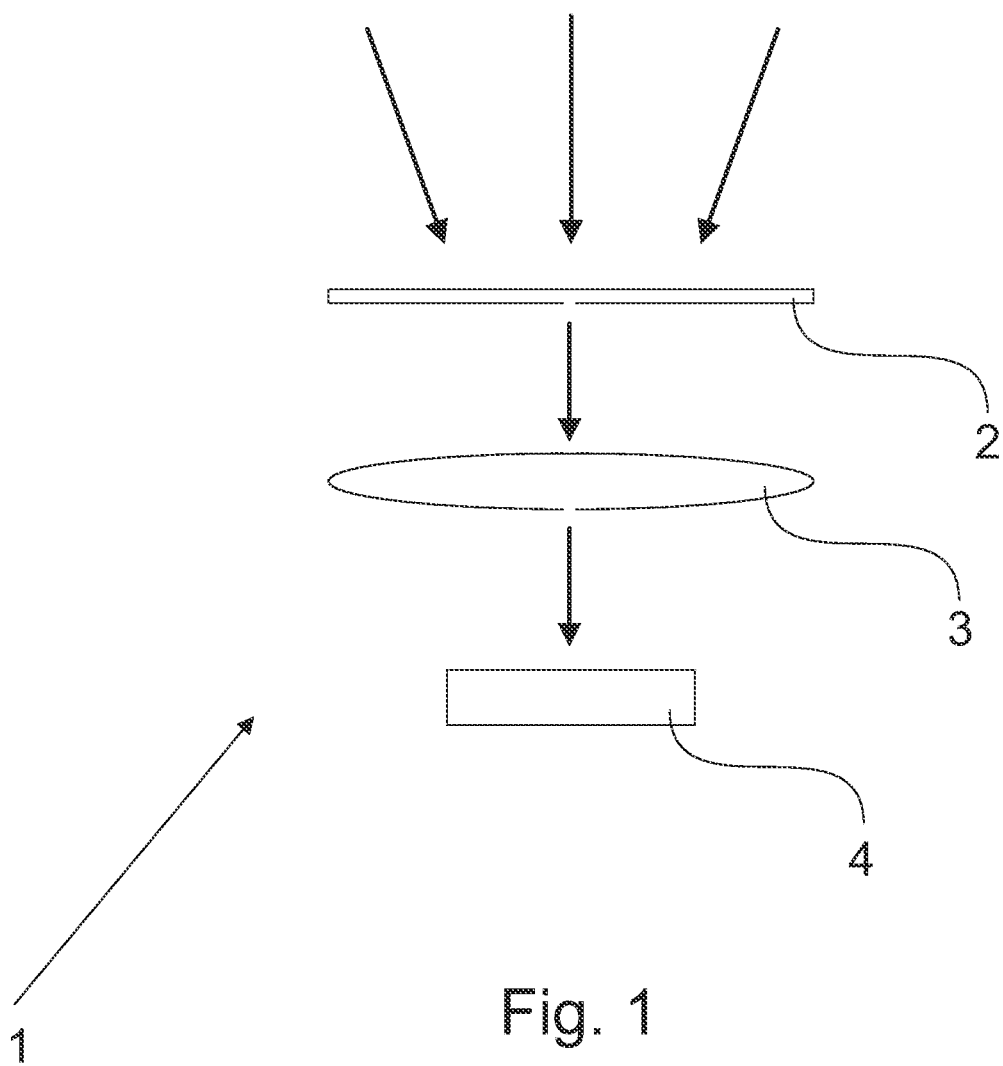
FIG. 1 schematically illustrates one embodiment of the detecting device.

The present application relates to a detecting device for indicating the intensity of a predetermined type of radiation present in electromagnetic radiation incident on the detecting device, wherein the detecting device comprises:
- a filter element for filtering incident electromagnetic radiation, wherein the filter element is configured to filter off electromagnetic radiation with a wavelength of above 590 nm from the incident electromagnetic radiation;
- a converging element configured to increase the density of photons of the predetermined type of radiation present in the incident electromagnetic radiation; and
- a sensor element of material arranged to receive the incident electromagnetic radiation that has passed through the filter element and the converging element for indicating the intensity of the predetermined type of radiation present in the incident electromagnetic radiation by change of the color of the sensor element of material, wherein the material is represented by the following formula (I)

$$(M')_8(M''M''')_6O_{24}(X,S)_2:M'''' \qquad \text{formula (I)}$$

wherein

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or any combination of such cations;

X represents an anion of an element selected from Group 16 of the IUPAC periodic table of the elements, or from Group 17 of the IUPAC periodic table of the elements, or any combination of such anions; and M'''' represents a dopant cation of an element selected from rare earth metals of the IUPAC periodic table of the elements, or from transition metals of the IUPAC periodic table of the elements, or any combination of such cations, or wherein M'''' is absent.

The present application further relates to a method for indicating the intensity of a predetermined type of radiation present in incident electromagnetic radiation, wherein the method comprises:

i) filtering off electromagnetic radiation with a wavelength of above 590 nm from the incident electromagnetic radiation;

ii) converging the incident electromagnetic radiation for increasing the density of photons of the predetermined type of radiation present in the incident electromagnetic radiation;

iii) exposing a sensor element of material to the incident electromagnetic radiation that has been filtered and converged in step i) and step ii), respectively, wherein the material is represented by the formula (I) as defined in this application;

iv) determining a change of the color of the sensor element of material; and v) comparing the color of the sensor element of material with a reference indicating the correlation of the intensity of the predetermined type of radiation with the color of the sensor element of material.

The present application further relates to the use of the detecting device as defined in the current application for indicating the intensity of a predetermined type of radiation present in electromagnetic radiation. In one embodiment, the detecting device is used for monitoring the quality and/or lifetime of e.g. an ultraviolet radiation sensitive material. In one embodiment, the detecting device is used for monitoring the intensity of e.g. ultraviolet radiation during light therapy.

In one embodiment, indicating the intensity of a predetermined type of radiation present in electromagnetic radiation comprises or refers to measuring and/or determining the intensity of a predetermined type of radiation present in electromagnetic radiation. In one embodiment, the beforehand unknown intensity of a predetermined type of radiation present in electromagnetic radiation is indicated, measured and/or determined.

In one embodiment, the intensity of a predetermined type of radiation present in electromagnetic radiation refers to the dose and/or amount of the predetermined type of radiation present in the electromagnetic radiation.

In one embodiment, the predetermined type of radiation is radiation having a wavelength of above 0 nm to 590 nm, or above 0 nm to 560 nm, or above 0 nm to 500 nm, or above 0 nm to 400 nm, or above 0 nm to 300 nm, or 0.000001-590 nm, or 0.000001-560 nm, or 0.000001-500 nm, or 10-590 nm, or 10-560 nm, or 10-500 nm, or 0.000001-400 nm, or 0.000001-300 nm, or 0.000001-10 nm, or 10-400 nm, or 10-300 nm, or 0.01-10 nm. In one embodiment, the predetermined type of radiation is ultraviolet radiation and/or X-radiation. In one embodiment, the predetermined type of radiation is ultraviolet radiation. In one embodiment, the predetermined type of radiation is X-radiation. In one embodiment, the predetermined type of radiation is gamma radiation.

In this specification, unless otherwise stated, the expression "incident" in relation to the electromagnetic radiation should be understood as the electromagnetic radiation that is incident on the detecting device from the surrounding of the detecting device. The electromagnetic radiation may be e.g. incoming solar radiation.

In one embodiment, step i) and step ii) are carried out one after the other in any order or step i) and step ii) are carried out simultaneously. In one embodiment, step i) and step ii) are carried out one after the other in any order or simultaneously before step iii) is carried out. In one embodiment, step i) is carried out before step ii). In one embodiment, step ii) is carried out before step i). In one embodiment, step i) and step ii) are carried out simultaneously.

In one embodiment, step iv) comprises visually determining the change of the color of the material.

The reference may be e.g. a card or the like that indicates the correlation between the intensity of the predetermined type of radiation and the intensity of the color of the sensor element of material.

In one embodiment, the intensity of the color of the sensor element of material is used to indicate the value of the UV index. In one embodiment, the correlation between the intensity of the color of the sensor element of material and the intensity of the ultraviolet radiation is calculated based on the following formula 1:

$$y = A1 * e^{(x/t1)} + y0 \qquad \text{formula 1}$$

wherein the parameters have the following meanings:
y=color intensity [percent of black]
A1=amplitude for color
x=UV index value for sunlight or UV lamp power [%] for UVA, UVB, and/or UVC
t1=growth constant for color
y0=initial offset for color.

In one embodiment, the filter element and the converging element are arranged one after the other when viewed from the direction of the electromagnetic radiation incident on the detecting device, such that the incident electromagnetic radiation first passes the filter element and then the converging element. In one embodiment, the filter element and the converging element are arranged one after the other when viewed from the direction of the electromagnetic radiation incident on the detecting device, such that the incident electromagnetic radiation first passes the converging element and then the filter element.

In one embodiment, the filter element and the converging element is the one and the same element. In one embodiment, the filter element and the converging element is one single element. In one embodiment, the filter element and the converging element is the one and the same element configured to filter off electromagnetic radiation with a wavelength of above 590 nm from the incident electromagnetic radiation and to increase the density of photons of the predetermined type of radiation present in the incident electromagnetic radiation. When the filter element and the converging element is the one and the same element, the incident electromagnetic radiation will simultaneously be subjected to both step i) and step ii).

In one embodiment, the filter element is made of glass, plastic, glass ceramic, or their combination. In one embodiment, the filter element comprises liquid, gas, or their combination. In one embodiment, the filter element is an electrical element and/or a semi-transparent element.

In one embodiment, the filter element is configured to filter off electromagnetic radiation with a wavelength of above 400 nm, or above 300 nm, from the incident electromagnetic radiation.

In one embodiment, the filter element (2) is configured to pass through incident electromagnetic radiation with a wavelength of above 0 nm to 590 nm, or above 0 nm to 560 nm, or above 0 nm to 500 nm, or above 0 nm to 400 nm, or above 0 nm to 300 nm, or 0.000001-590 nm, or 0.000001-560 nm, or 0.000001-500 nm, or 0.01-590 nm, or 0.01-560 nm, or 0.01-500 nm, or 0.01-400 nm, or 0.01-300 nm, or 10-590 nm, or 10-560 nm, or 10-500 nm, or 0.000001-400 nm, or 0.000001-300 nm, or 0.000001-10 nm, or 10-400 nm, or 10-300 nm, or 0.01-10 nm.

The use of the filter element in the detecting device has the added utility of enabling the reduction of the amount of visible light and/or near-red infrared radiation that will reach the sensor element of material, whereby the intensity of the color change of the material being exposed to the predetermined type of radiation, such as ultraviolet radiation, present in the incident electromagnetic radiation may be increased. The inventors surprisingly found out that it was possible to increase the intensity of the color change shown by the sensor element of material when being exposed to the predetermined type of radiation, when the incident electromagnetic radiation was filtered in order to block or reduce therefrom the amount of visual light and/or near infrared radiation. The inventors noticed that by the detecting device it was possible to reduce the effect of visible light erasing the color of the sensor element of material such that a more intense color change can be achieved.

The converging element may be used to increase the intensity of energy or the density of photons of the predetermined type of radiation in order to achieve a more intense or strong color changing effect of the sensor element of material. In one embodiment, the converging element is used to increase the photon flux density of the predetermined type of radiation. In one embodiment, the use of the converging element increases the number of photons of the predetermined type of radiation that hit the sensor element of material. Thus, the converging element may be used to converge predetermined type of radiation beam to a smaller area. In one embodiment, the converging element is configured to converge the beam of the incident electromagnetic radiation with a densification factor of 1.00001-10000, or 1.0001-10000, or 1.001-10000, or 1.01-10000, or 1.1-10000, or 1.00001-2500, or 1.0001-2500, or 1.001-2500, or 1.01-2500, or 1.1-2500, or 1.00001-1200, or 1.0001-1200, or 1.001-1200, or 1.01-1200, or 1.1-1200, or 1.00001-1000, or 1.0001-1000, or 1.001-1000, or 1.01-1000, or 1.1-1000, or 1.00001-800, or 1.0001-800, or 1.001-800, or 1.01-800, or 1.1-800, or 1.00001-550, or 1.0001-550, or 1.001-550, or 1.01-550, or 1.1-550, or 1.00001-500, or 1.0001-500, or 1.001-500, or 1.01-500, or 1.1-500, or 1.00001-100, or 1.0001-100, or 1.001-100, or 1.01-100, or 1.1-100. In this specification, unless otherwise stated, the expression "densification factor" should be understood as the ratio between the size of the beam of the electromagnetic radiation before being transferred through the converging element and the size of the beam of the electromagnetic radiation after being transferred through the converging element. The converging element has the added utility of focusing the incident electromagnetic radiation to a smaller area, whereby the density of photons is increased. The intensity of the color change of the sensor element of material may be further increased when focusing the incident electromagnetic radiation, e.g. the filtered part thereof, with a converging element such that the density of photons is increased. In one embodiment, the converging element is a lens, a mirror, a prism, a lattice, a diffraction lattice, a semi-transparent mirror, an electrical filter or any combination thereof.

In one embodiment, the detecting device is subjected to electromagnetic radiation. In one embodiment, the incident electromagnetic radiation is sunlight. In one embodiment, the incident electromagnetic radiation originates from a source of artificial radiation or from sunlight. In one embodiment, the artificial radiation is UV light, LED-light, halogen light, solar simulator light, fluorescent light, X-radiation, or any combination thereof.

In one embodiment, the material of the sensor element is a synthetic material. I.e. in one embodiment, the material is synthetically prepared.

In one embodiment, the sensor element comprises the material represented by the formula (I). In one embodiment, the sensor element consists of the material represented by the formula (I). In one embodiment, the sensor element is made of the material represented by the formula (I).

In this specification, unless otherwise stated, the expression "monoatomic ion" should be understood as an ion consisting of a single atom. If an ion contains more than one atom, even if these atoms are of the same element, it is to be understood as a polyatomic ion. Thus, in this specification, unless otherwise stated, the expression "monoatomic cation" should be understood as a cation consisting of a single atom.

Hackmanite, which is a variety of sodalite material, is natural mineral having the chemical formula of $Na_8Al_6Si_6O_{24}$ $(Cl,S)_2$. A synthetic hackmanite based material enabling the detection of ultraviolet radiation can be prepared. The synthetic material of formula (I), as a result of being subjected to ultraviolet radiation, has the technical effect of showing color intensity, which is proportional with the irradiance of the sensed or detected radiation. The material may thus be used to detect and indicate the amount of e.g. ultraviolet B radiation and ultraviolet C radiation that cause sunburn.

Ultraviolet light is electromagnetic radiation with a wavelength from 10 nm (30 PHz) to 400 nm (750 THz). The electromagnetic spectrum of ultraviolet radiation (UVR) can be subdivided into a number of ranges recommended by the ISO standard ISO-21348, including ultraviolet A (UVA), ultraviolet B (UVB), ultraviolet C (UVC). The wavelength of UVA is generally considered to be 315-400 nm, the wavelength of UVB is generally considered to be 280-320 nm and the wavelength of UVC is generally considered to be 100-290 nm.

In one embodiment, the ultraviolet radiation comprises ultraviolet A radiation, ultraviolet B radiation and/or ultraviolet C radiation. In one embodiment, the ultraviolet radiation consists of ultraviolet A radiation, ultraviolet B radiation and/or ultraviolet C radiation. In one embodiment, the ultraviolet radiation is ultraviolet A radiation, ultraviolet B radiation and/or ultraviolet C radiation.

In one embodiment, M' represents a monoatomic cation of an alkali metal selected from a group consisting of Na, Li, K, and Rb, or any combination of such cations. In one embodiment, M' represents a monoatomic cation of an alkali metal selected from a group consisting of Li, K, and Rb, or any combination of such cations.

In one embodiment, M' represents a monoatomic cation of an alkali metal selected from Group 1 of the IUPAC periodic table of the elements, or any combination of such cations; with the proviso that M' does not represent the monoatomic cation of Na alone.

In one embodiment, M' represents a combination of at least two monoatomic cations of different alkali metals selected from Group 1 of the IUPAC periodic table of the elements.

In one embodiment, M' represents a combination of at least two monoatomic cations of different alkali metals selected from Group 1 of the IUPAC periodic table of the elements, and wherein the combination comprises at most 66 mole percent (mol-%) of the monoatomic cation of Na. In one embodiment, M' represents a combination of at least two monoatomic cations of different alkali metals selected from Group 1 of the IUPAC periodic table of the elements, and wherein the combination comprises at most 50 mol-% of the monoatomic cation of Na. In one embodiment, M' represents a combination of at least two monoatomic cations of different alkali metals selected from Group 1 of the IUPAC periodic table of the elements, and wherein the combination comprises at most 40 mol-% of the monoatomic cation of Na, or at most 30 mol-% of the monoatomic cation of Na, or at most 20 mol-% of the monoatomic cation of Na.

In one embodiment, M' represents a combination of at least two monoatomic cations of different alkali metals selected from Group 1 of the IUPAC periodic table of the elements, wherein the combination comprises 0-98 mol-% of the monoatomic cation of Na. In one embodiment, M' represents a combination of at least two monoatomic cations of different alkali metals selected from Group 1 of the IUPAC periodic table of the elements, wherein the combination comprises 0-98 mol-%, or 0-95 mol-%, or 0-90 mol-%, or 0-85 mol-%, or 0-80 mol-%, or 0-70 mol-%, of the monoatomic cation of Na. In one embodiment, M' represents a combination of at least two monoatomic cations of different alkali metals selected from Group 1 of the IUPAC periodic table of the elements, wherein the combination comprises 0-100 mol-% of the monoatomic cation of K. In one embodiment, M' represents a combination of at least two monoatomic cations of different alkali metals selected from Group 1 of the IUPAC periodic table of the elements, wherein the combination comprises 0-100 mol-% of the monoatomic cation of Rb. In one embodiment, M' represents a combination of at least two monoatomic cations of different alkali metals selected from Group 1 of the IUPAC periodic table of the elements, wherein the combination comprises 0-100 mol-% of the monoatomic cation of Li.

In one embodiment, M' represents a combination of at least two monoatomic cations of different alkali metals selected from a group consisting of Li, Na, K, and Rb. In one embodiment, M' represents a combination of two monoatomic cations of different alkali metals selected from a group consisting of Li, Na, K, and Rb. In one embodiment, M' represents a combination of three monoatomic cations of different alkali metals selected from a group consisting of Li, Na, K, and Rb. In one embodiment, M' represents a combination of monoatomic cations of Li, Na, K, and Rb.

In one embodiment, M' represents a combination of a monoatomic cation of Na with a monoatomic cation of Li, a monoatomic cation of K and/or a monoatomic cation of Rb. In one embodiment, M' represents a combination of a monoatomic cation of Na with a monoatomic cation of K or a monoatomic cation of Rb. In one embodiment, M' represents a combination of a monoatomic cation of Na with a monoatomic cation of K and a monoatomic cation of Rb.

In one embodiment, M' represents a combination of a monoatomic cation of Na and a monoatomic cation of K; or a combination of a monoatomic cation of Na and a monoatomic cation of Rb; or a combination of a monoatomic cation of K and a monoatomic cation of Rb; or a combination of a monoatomic cation of Na, a monoatomic cation of K, and a monoatomic cation of Rb; or a combination of a monoatomic cation of K and a monoatomic cation of Rb.

In one embodiment, M' represents a combination of a monoatomic cation of Li and a monoatomic cation of Na; or a combination of a monoatomic cation of Li and a monoatomic cation of K; or a combination of a monoatomic cation of Li and a monoatomic cation of Rb; or a combination of a monoatomic cation of Li, a monoatomic cation of K, and a monoatomic cation of Rb; or a combination of a monoatomic cation of Li, a monoatomic cation of Na, a monoatomic cation of K and a monoatomic cation of Rb.

In one embodiment, M' represents a monoatomic cation of Li. In one embodiment, M' represents a monoatomic cation of K. In one embodiment, M' represents a monoatomic cation of Rb.

The combination of at least two monoatomic cations of different alkali metals selected from Group 1 of the IUPAC periodic table of the elements has the effect of enabling the preparation of a material that is sensitive to ultraviolet A radiation, ultraviolet B radiation and/or ultraviolet C radiation. The combination has the effect of enabling the preparation of a material being able to indicate the presence of at least one of ultraviolet A radiation, ultraviolet B radiation and ultraviolet C radiation, or the presence of all of ultraviolet A radiation, ultraviolet B radiation and ultraviolet C radiation.

In one embodiment, M" represents a trivalent monoatomic cation of a metal selected from a group consisting of Al and Ga, or a combination of such cations.

In one embodiment, M" represents a trivalent monoatomic cation of B.

In one embodiment, M'" represents a monoatomic cation of an element selected from a group consisting of Si and Ge, or a combination of such cations.

In one embodiment, X represents an anion of an element selected from a group consisting of F, Cl, Br, and I, or any combination of such anions.

In one embodiment, X represents an anion of an element selected from a group consisting of O, S, Se, and Te, or any combination of such anions.

In one embodiment, the material is represented by formula (I), wherein M"" is absent. In this embodiment the material is not doped.

In one embodiment, the material is doped with at least one rare earth metal ion and/or at least one transition metal ion. In one embodiment, the material is doped with at least one rare earth metal ion and at least one transition metal ion. In one embodiment, the material is doped with at least one rare earth metal ion or at least one transition metal ion.

In one embodiment, the material is represented by formula (I), wherein M"" represents a cation of an element selected from rare earth metals of the IUPAC periodic table of the elements, or from transition metals of the IUPAC periodic table of the elements, or any combination of such cations.

In one embodiment, M"" represents a cation of an element selected from a group consisting of Eu and Tb, or a combination of such cations. In one embodiment, M"" represents a cation of an element selected from a group consisting of Ti, V, Cr, Mn, Fe, Co, Ni, Cu, and Zn, or any combination of such cations.

In one embodiment, M' represents a combination of at least two monoatomic cations of different alkali metals selected from a group consisting of Li, Na, K, and Rb, and wherein the combination is selected in order to provide a predetermined absorption edge for the material. In this specification, unless otherwise stated, the expression "absorption edge" should be understood as the energy threshold over which energy the material will change color.

In one embodiment, the material may change color on exposure to ultraviolet radiation, wherein the correlation between the intensity of the color of the material and the intensity of the ultraviolet radiation is calculated based on the following formula 1:

$$y = A1 * e^{(x/t1)} + y0 \qquad \text{formula 1}$$

wherein the parameters have the following meanings:
y=color intensity [percent of black]
A1=amplitude for color
x=UV index value for sunlight or UV lamp power [%] for UVA, UVB, and/or UVC
t1=growth constant for color
y0=initial offset for color.

Based on the above formula 1, the radiation intensity can be calculated from the color intensity as follows:

$$x = t1 * [\ln(y - y0) - \ln A1].$$

In one embodiment, for solar UVI detection, $A1=-1$ to $-15$, $t1=-30$ to $-5$, and $y0=5$ to $20$.

In one embodiment, for UVA detection, $A1=-1.5$ to $-0.1$, $t1=-30$ to $-10$, and $y0=9.5$ to $10.5$.

In one embodiment, for UVB detection, $A1=-3.0$ to $-1.8$, $t1=-450$ to $-20$, and $y0=11$ to $13$.

In one embodiment, for UVC detection, $A1=-3.0$ to $-1.8$, $t1=-200$ to $-15$, and $y0=12$ to $13$.

The change in the combination of at least two monoatomic cations of different alkali metals selected from Group 1 of the IUPAC periodic table of the elements enables to prepare a material that can be adjusted to detect ultraviolet A radiation, ultraviolet B radiation and/or ultraviolet C radiation.

In one embodiment, the material is selected from a group consisting of $(Na,K)_8Al_6Si_6O_{24}(Cl,S)_2$, $(Na,Rb)_8Al_6Si_6O_{24}(Cl,S)_2$, $(Na,K,Rb)_8Al_6Si_6O_{24}(Cl,S)_2$, $(Na,K)_8Al_6Si_6O_{24}(Cl,S)_2$:EU, $(Na,K)_8Al_6Si_6O_{24}(Cl,S)_2$:Tb, $(Li,K)_8Al_6Si_6O_{24}(Cl,S)_2$, $(Li,Rb)_8Al_6Si_6O_{24}(Cl,S)_2$, $(Li,K,Rb)_8Al_6Si_6O_{24}(Cl,S)_2$, and $(Li, Na,K,Rb)_8Al_6Si_6O_{24}(Cl,S)_2$.

In one embodiment, the material is $(Na,K)_8Al_6Si_6O_{24}(Cl_{0.8}S_{0.05})_2$. Said material may be used for sensing ultraviolet radiation.

In one embodiment, the material is $(Na,K)_8Al_6Si_6O_{24}(F_{0.7}S_{0.1})_2$. Said material may be used for sensing X-radiation.

In one embodiment, the material is synthesized by a reaction according to Norrbo et al. (Norrbo, I.; Głuchowski, P.; Paturi, P.; Sinkkonen, J.; Lastusaari, M., Persistent Luminescence of Tenebrescent $Na_8Al_6Si_6O_{24}(Cl,S)_2$: Multifunctional Optical Markers. Inorg. Chem. 2015, 54, 7717-7724), which reference is based on Armstrong & Weller (Armstrong, J. A.; Weller, J. A. Structural Observation of Photochromism. Chem. Commun. 2006, 1094-1096) using stoichiometric amounts of Zeolite A and $Na_2SO_4$ as well as LiCl, NaCl, KCl and/or RbCl as the starting materials. The possibly used at least one dopant is added as an oxide, such as $Eu_2O_3$ or $Tb_4O_7$. The material can be prepared as follows: Zeolite A is first dried at 500° C. for 1 h. The initial mixture is then heated at 850° C. in air for 48 h. The product is then freely cooled down to room temperature and ground. Finally, the product is re-heated at 850° C. for 2 h under a flowing 12% $H_2$+88% $N_2$ atmosphere. The as-prepared materials are washed with water to remove any excess LiCl/NaCl/KCl/RbCl impurities. The purity can be verified with an X-ray powder diffraction measurement.

In one embodiment, the detecting device is an ultraviolet radiation sensor, an ultraviolet radiation detector, or an ultraviolet radiation indicator. In one embodiment, the detecting device is an X-radiation sensor, an X-radiation detector, or an X-radiation indicator. In one embodiment, the detecting device is a gamma radiation sensor, a gamma radiation detector, or a gamma radiation indicator.

The detector device can be applied e.g. on the outside of a window to alert the residents before going out about the ultraviolet radiation intensity. The detecting device may also be part of e.g. a plastic bottle, a sticker, a glass, and a similar product that is to be provided with a UV indicator. This offers the products themselves a UV indicator. The detecting device may also be conceived as jewelry. The detecting device may also be part of a display portion of a meter, which is calibrated according to the shade. In one embodiment, the detecting device is a security device or a part thereof. In one embodiment, the security device is selected from a group consisting of a thread, a foil and a hologram. In one embodiment, the security device is used on a banknote, a passport or an identity card.

In one embodiment, the detecting device is used for indicating the intensity of ultraviolet radiation. In one embodiment, the ultraviolet radiation is ultraviolet A radiation, ultraviolet B radiation and/or ultraviolet C radiation. In one embodiment, the detecting device is used for indicating the intensity of electromagnetic radiation with a wavelength of 0.01-400 nm, or of 10-400 nm, or of 0.01-10 nm. In one embodiment, the detecting device is used for indicating the intensity of X-radiation. X-radiation is electromagnetic radiation with a wavelength from 0.01 nm to 10 nm.

It will be understood that the benefits and advantages described above may relate to one embodiment or may relate to several embodiments. The embodiments are not limited to those that solve any or all of the stated problems or those that have any or all of the stated benefits and advantages.

The embodiments described hereinbefore may be used in any combination with each other. Several of the embodiments may be combined together to form a further embodiment. A detecting device, a use, or a method, to which the application is related, may comprise at least one of the embodiments described hereinbefore.

The detecting device has the added utility of enabling efficient estimation of the intensity of ultraviolet radiation present in e.g. sunlight. The detecting device has the added utility of enabling a fast and a reliable manner to estimate the need to cover form sunlight or to estimate the need to e.g. reapply sunscreen lotion when spending time outside in sunshine.

The material of the sensor element has the added utility of being a low-cost material offering stability even in high UV levels as well as decoloration with white light and/or under heating. The material has the added utility that its color can be returned to colorless (white), i.e. decolored, with visible light or heating thus enabling it to be reused. The material has the added utility that it follows well the erythemal action spectrum making it possible to monitor especially UVB and UVC that cause sunburn. The material has the added utility that with sunlight the color intensity can be used to indicate the value of the UV index.

EXAMPLES

Reference will now be made in detail to the described embodiments, examples of which are illustrated in the accompanying drawings.

The description below discloses some embodiments in such a detail that a person skilled in the art is able to utilize the detecting device and the method based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

FIG. 1 illustrates schematically one embodiment of the detecting device for indicating the intensity of the predetermined type of radiation present in electromagnetic radiation incident on the detecting device. The bolded arrows in FIG. 1 are to indicate the incoming electromagnetic radiation incident on the device and the manner the electromagnetic radiation propagates through the filter element and the converging element to the sensor element of material. The detecting device 1 as illustrated in FIG. 1 comprises a filter element 2 for filtering incident electromagnetic radiation. The filter element 2 is configured to filter off electromagnetic radiation with a wavelength of above 590 nm from the incident electromagnetic radiation. Further, the detecting device 1 comprises a converging element 3 configured to increase the density of photons of the predetermined type of radiation present in the incident electromagnetic radiation. Also, the detecting device as illustrated in FIG. 1 comprises a sensor element of material 4, which is arranged to receive the incident electromagnetic radiation that has passed through the filter element and the converging element for indicating the intensity of the predetermined type of radiation present in the incident electromagnetic radiation by change of the color of the sensor element of material. The material is represented by formula (I) as defined in the current application.

In FIG. 1 the filter element and the converging element are arranged such that incident electromagnetic radiation may first pass the filter element and thereafter the converging element. The order may also be vice versa, i.e. these elements may equally well be arranged such that incident electromagnetic radiation may first pass the converging element and only thereafter the filter element. In one embodiment, the filter element and the converging element may be the one and the same element, i.e. one single element configured to filter off electromagnetic radiation with a wavelength of above 590 nm from the incident electromagnetic radiation and to increase the density of photons of the predetermined type of radiation present in the incident electromagnetic radiation.

In the below examples, it is presented how the material of formula (I) may be prepared.

Example 1-Preparing $(Na,K)_8Al_6Si_6O_{24}$ $(Cl,S)_2$

The material represented by the formula $(Na,K)_8Al_6Si_6O_{24}$ $(Cl,S)_2$ was prepared in the following manner: 0.7000 g of dried (500° C. for 1 h) Zeolite A, 0.0600 g of $Na_2SO_4$ and 0.3067 g of KCl powders were mixed together. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 2-Preparing $(Na,Rb)_8Al_6Si_6O_{24}$ $(Cl,S)_2$

The material represented by the formula $(Na,Rb)_8Al_6Si_6O_{24}$ $(Cl,S)_2$ was prepared in the following manner: 0.7000 g of dried (500° C. for 1 h) Zeolite A, 0.0600 g of $Na_2SO_4$ and 0.4957 g of RbCl powders were mixed together. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 3-Preparing $(Na,K)_8Al_6Si_6O_{24}$ $(Cl,S)_2$ (denoted hereafter as "Na,K Composition 2")

The material represented by the formula $(Na,K)_8Al_6Si_6O_{24}$ $(Cl,S)_2$ was prepared in the following manner: 0.7000 g of dried (500° C. for 1 h) Zeolite A, 0.0600 g of $Na_2SO_4$ and 0.1800 g of NaCl and 0.0675 g KCl powders were mixed together. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 4-Preparing $(Na,K)_8Al_6Si_6O_{24}$ $(Cl,S)_2$:Eu

The material represented by the formula $(NaK)_8Al_6Si_6O_{24}$ $(Cl,S)_2$:Eu was prepared in the following manner: 0.7000 g of dried (500° C. for 1 h) Zeolite A, 0.0600 g of $Na_2SO_4$ and 0.1800 g of NaCl and 0.0675 g of KCl powders were mixed together with 0.002 g of $Eu_2O_8$ powder. The mixture was heated at 850° C. in air for 48 h. The product was freely cooled down to room temperature and ground. Finally, the product was re-heated at 850° C. for 2 h under a flowing 12% $H_2$+88% $N_2$ atmosphere.

Example 5-Testing of a Sample of the Material Prepared in Example 1

Figure 2:
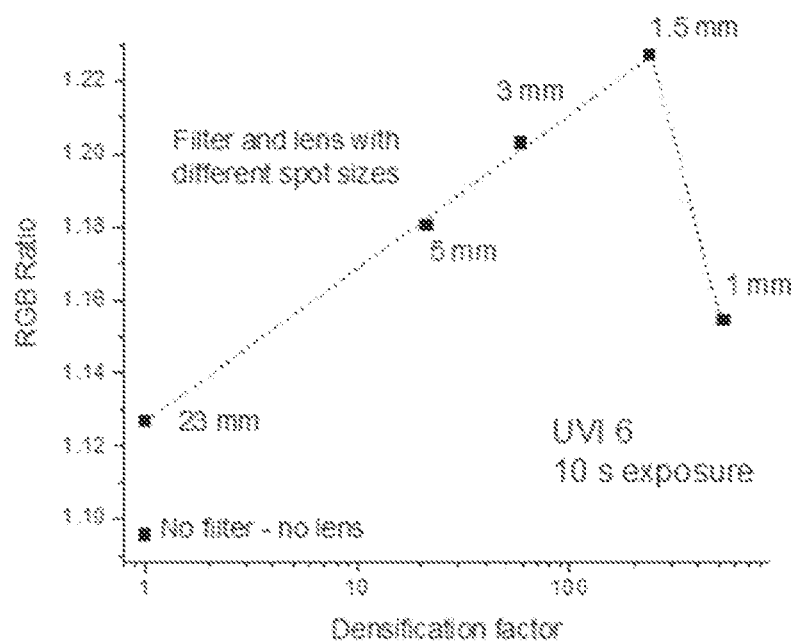
FIG. 2 discloses the test results of example 5.

A sample of the material prepared in example 1 was tested by subjecting it to radiation from a solar simulator lamp for 10 s at UVI 6. The radiation from the lamp was filtered with a visible light blocking filter blocking all light above 400 nm and converged with a lens. The size of the focal spot was varied and the corresponding color intensity was recorded using a cell phone camera. The color intensity was determined by calculating the Red-Green-Blue (RGB) ratio of a non-exposed white material and the colored material. The results are presented in FIG. 2. The results indicate that increasing the densification factor increases the color intensity until the beam size gets too small.

Example 6-Testing of a Sample of the Material Prepared in Example 1

Figure 3:
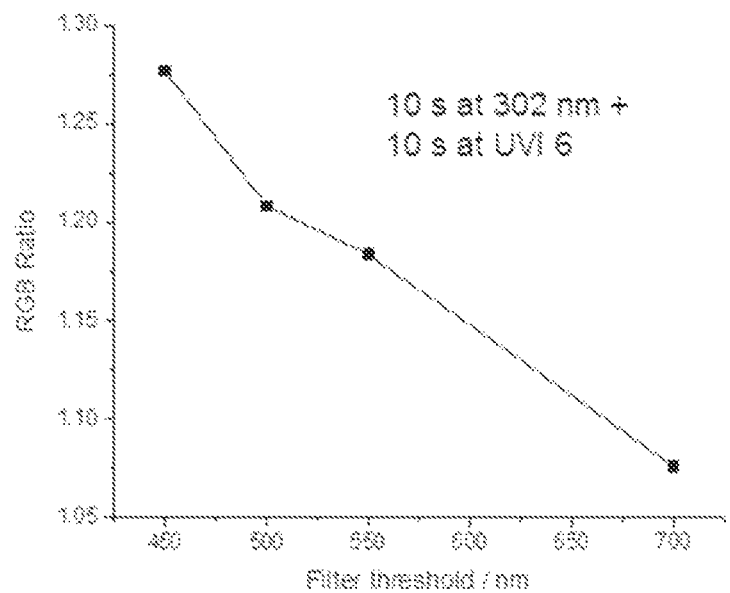
FIG. 3 discloses the test results of example 6.

A sample of the material prepared in example 1 was tested by firstly subjecting it to 10 s of 302 nm radiation and then to 10 s of solar simulator lamp at UVI 6. The light from the solar simulator was converged with a lens at densification factor 235 and directed through a filter to the material. A reference material was subjected only to 10 s of 302 nm radiation. The color intensity was recorded using a cell phone camera, and the RGB ratio between the reference subjected only to 302 nm and the sample subjected to 302 nm and filtered solar simulator lamp was calculated for each filter. The results are presented in FIG. 3. The results show that the higher is the amount of visible light reaching the material the less intense is the color.

Example 7-Testing of a Sample of the Material Prepared in Example 1

Figure 4:
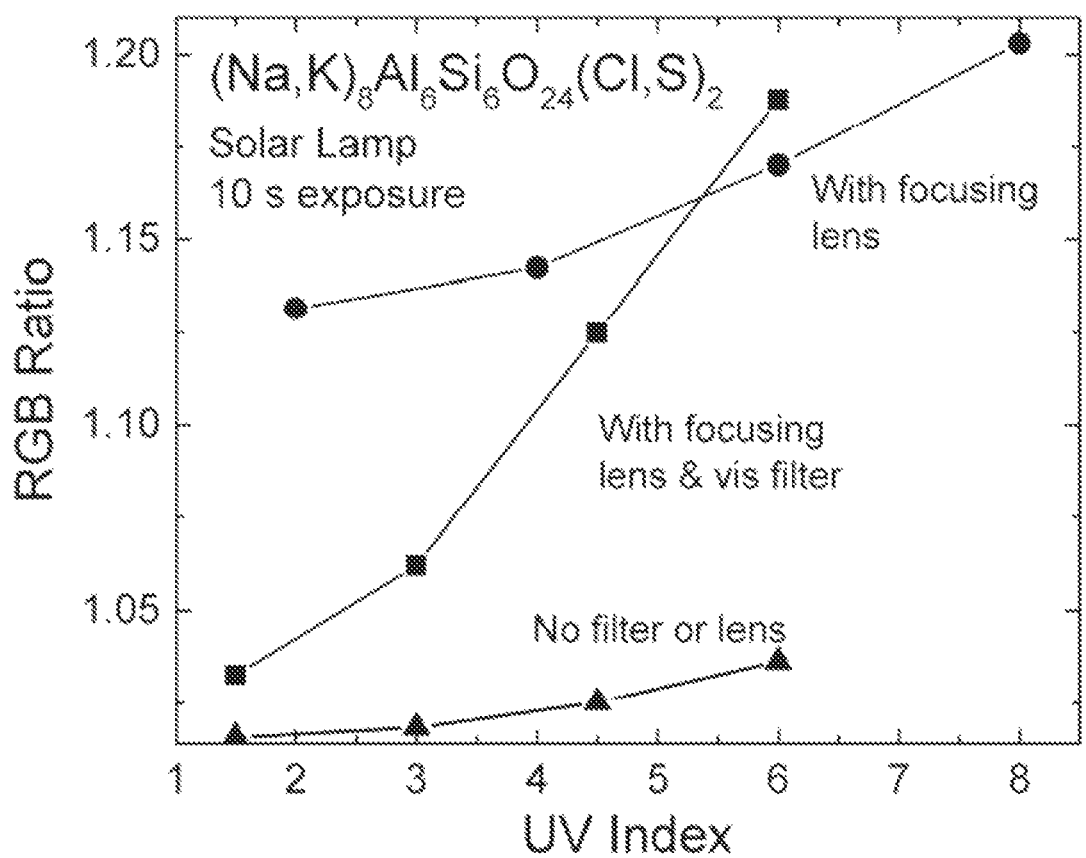
FIG. 4 discloses the test results of example 7.

A sample of the material prepared in example 1 was tested by irradiating the material for 10 s at different ultraviolet index (UVI) values 1) without using a filter element or a converging element, 2) with using a filter element blocking all radiation above 400 nm, and 3) with using a filter element blocking all radiation above 400 nm and a lens with densification factor of 22 as a converging element. The color intensity was recorded using a cell phone camera. The color intensity was determined by calculating the RGB ratio of a non-exposed white material and the colored material. The results are presented in FIG. 4.

It is to be noted that the embodiments of the claims are not limited to those discussed above, but further embodiments may exist within the scope of the claims.

The invention claimed is:

1. A detecting device for indicating an intensity of a predetermined type of radiation present in electromagnetic radiation incident on the detecting device, wherein the detecting device comprises:
a filter element for filtering the incident electromagnetic radiation, wherein the filter element is configured to filter off electromagnetic radiation with a wavelength of above 590 nm from the incident electromagnetic radiation;

a converging element configured to increase a density of photons of the predetermined type of radiation present in the incident electromagnetic radiation; and a sensor element comprising a material arranged to receive the incident electromagnetic radiation that has passed through the filter element and the converging element, wherein the sensor element is operable to indicate an intensity of the predetermined type of radiation present in the incident electromagnetic radiation by change of a color of the sensor element, wherein the material is represented by formula (I), comprising: $(M')_8 (M''M''')_6 O_{24} (X,S)_2 :M''''$ wherein:

M' represents a monoatomic cation of an alkali metal selected from Group 1 of the IUPAC periodic table of the elements, or any combination of such cations;

M'' represents a trivalent monoatomic cation of an element selected from Group 13 of the IUPAC periodic table of the elements, or of a transition element selected from any of Groups 3-12 of the IUPAC periodic table of the elements, or any combination of such cations;

M''' represents a monoatomic cation of an element selected from Group 14 of the IUPAC periodic table of the elements, or any combination of such cations;

X represents an anion of an element selected from Group 16 of the IUPAC periodic table of the elements, or from Group 17 of the IUPAC periodic table of the elements, or any combination of such anions; and M'''' represents a dopant cation of an element selected from rare earth metals of the IUPAC periodic table of the elements, or from transition metals of the IUPAC periodic table of the elements, or any combination of such cations, or wherein M'''' is absent.

2. The detecting device of claim 1, wherein the filter element is configured to filter off electromagnetic radiation with a wavelength of above 400 nm, or above 300 nm, from the incident electromagnetic radiation.

3. The detecting device of claim 1, wherein the filter element is configured to pass through incident electromagnetic radiation with a wavelength of above 0 nm to 590 nm, or above 0 nm to 560 nm, or above 0 nm to 500 nm, or above 0 nm to 400 nm, or above 0 nm to 300 nm, or 0.000001-590 nm, or 0.000001-560 nm, or 0.000001-500 nm, 0.000001-400 nm, or 0.000001-300 nm, or 0.000001-10 nm, 0.01-590 nm, or 0.01-560 nm, or 0.01-500 nm, or 10-590 nm, or 10-560 nm, or 10-500 nm, or 0.01-400 nm, or 0.01-300 nm, or 10-400 nm, or 10-300 nm, or 0.01-10 nm.

4. The detecting device of claim 1, wherein the filter element and the converging element are a combined element configured to filter off electromagnetic radiation with a wavelength of above 590 nm from the incident electromagnetic radiation and to increase the density of photons of the predetermined type of radiation present in the incident electromagnetic radiation.

5. The detecting device of claim 1, wherein the incident electromagnetic radiation originates from a source of artificial radiation or from sunlight.

6. The detecting device of claim 1, wherein M' represents a combination of at least two monoatomic cations of different alkali metals selected from Group 1 of the IUPAC periodic table of the elements.

7. The detecting device of claim 1, wherein M' represents a combination of at least two monoatomic cations of different alkali metals selected from Group 1 of the IUPAC periodic table of the elements, wherein the combination comprises 0-98 mol-%, or 0-95 mol-%, or 0-90 mol-%, or 0-85 mol-%, or 0-80 mol-%, or 0-70 mol-%, of a monoatomic cation of Na.

8. The detecting device of claim 1, wherein M' represents a combination of at least two monoatomic cations of different alkali metals selected from a group consisting of Li, Na, K, and Rb.

9. The detecting device of claim 1, wherein M'' represents a trivalent monoatomic cation of a metal selected from a group consisting of Al and Ga, or a combination of such cations.

10. The detecting device of claim 1, wherein M'' represents a trivalent monoatomic cation of B.

11. The detecting device of claim 1, wherein M''' represents a monoatomic cation of an element selected from a group consisting of Si and Ge, or a combination of such cations.

12. The detecting device of claim 1, wherein X represents an anion of an element selected from a group consisting of O, S, Se, and Te, or any combination of such anions.

13. The detecting device of claim 1, wherein X represents an anion of an element selected from a group consisting of F, Cl, Br, and I, or any combination of such anions.

14. The detecting device of claim 1, wherein M'''' represents a cation of an element selected from a group consisting of Eu and Tb, or a combination of such cations.

15. The detecting device of claim 1, wherein M'''' represents a cation of an element selected from a group consisting of Ti, V, Cr, Mn, Fe, Co, Ni, Cu, and Zn, or any combination of such cations.

16. A method for indicating an intensity of a predetermined type of radiation present in incident electromagnetic radiation, wherein the method comprises:

filtering off electromagnetic radiation with a wavelength of above 590 nm from the incident electromagnetic radiation;

converging the incident electromagnetic radiation for increasing a density of photons of the predetermined type of radiation present in the incident electromagnetic radiation;

subsequent to the filtering and converging, exposing a sensor element comprising a material to the incident electromagnetic radiation, wherein the material is represented by formula (I), comprising: $(M')_8 (M''M''')_6 O_{24} (X,S)_2 :M''''$;

determining a change of a color of the sensor element as a result of the material being exposed to the incident electromagnetic radiation; and comparing the color of the sensor element with a reference indicating a correlation of the intensity of the predetermined type of radiation with the color of the sensor element.

17. The method of claim 16, wherein the filtering and the converging steps are carried out one after the other in any order or wherein the filtering and converging steps are carried out simultaneously.

18. A method comprising:

using the detecting device of claim 1 for indicating an intensity of a predetermined type of radiation present in electromagnetic radiation.

19. The method of claim 18, further comprising:

subjecting the detecting device to the electromagnetic radiation.

* * * * *